(12) United States Patent
Ette

(10) Patent No.: US 11,052,874 B2
(45) Date of Patent: Jul. 6, 2021

(54) RECOGNIZING AUTHORIZED VEHICLE USER WITH MOVEMENT DATA

(71) Applicant: Volkswagen Aktiengesellschaft, Wolfsburg (DE)

(72) Inventor: Bernd Ette, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/721,290

(22) Filed: Dec. 19, 2019

(65) Prior Publication Data

US 2020/0198581 A1   Jun. 25, 2020

(30) Foreign Application Priority Data

Dec. 21, 2018   (DE) ...................... 10 2018 222 761.6

(51) Int. Cl.
| | |
|---|---|
| *B60R 25/31* | (2013.01) |
| *G06N 3/08* | (2006.01) |
| *G06N 3/04* | (2006.01) |
| *B60R 25/24* | (2013.01) |
| *B60R 25/01* | (2013.01) |

(52) U.S. Cl.
CPC .............. *B60R 25/31* (2013.01); *B60R 25/01* (2013.01); *B60R 25/24* (2013.01); *G06N 3/04* (2013.01); *G06N 3/08* (2013.01)

(58) Field of Classification Search
CPC ......... B60R 25/21; B60R 25/31; B60R 25/01; B60R 25/24; G06N 3/04; G06N 3/08
See application file for complete search history.

(56) References Cited

U.S. PATENT DOCUMENTS

| | | | |
|---|---|---|---|
| 9,467,817 B1 * | 10/2016 | Van Wiemeersch | ........................ H04W 4/029 |
| 9,707,911 B1 * | 7/2017 | Myers | ..................... H04W 4/70 |
| 2011/0218709 A1 * | 9/2011 | Hermann | ................ B60R 25/24 |
| | | | 701/45 |

(Continued)

FOREIGN PATENT DOCUMENTS

| | | |
|---|---|---|
| DE | 102006037237 A1 | 2/2008 |
| DE | 102007041288 A1 | 3/2009 |

(Continued)

OTHER PUBLICATIONS

German Office Action from corresponding German Application No. 10 2018 222 761.6, dated May 10, 2019.

*Primary Examiner* — Thomas D Alunkal

(74) *Attorney, Agent, or Firm* — Loza & Loza, LLP; Peter Zura

(57) ABSTRACT

The invention relates to a method for authenticating a vehicle user. In the method, movement data of a sensor identification circuit are detected by sensors. The detected movement data are supplied to a self-learning system. The self-learning system ascertains a movement profile based on the supplied movement data and assigns this to a vehicle user. Upon approach of the vehicle by a vehicle user, it is checked whether movement data detected at the point in time of the approach corresponds to a movement profile, which is assigned to a vehicle user authorized to use the vehicle. In the event of a match, the vehicle user approaching the vehicle is authorized to use the vehicle.

20 Claims, 5 Drawing Sheets

(56) References Cited

U.S. PATENT DOCUMENTS

| | | | | |
|---|---|---|---|---|
| 2015/0291126 A1* | 10/2015 | Nicholls | ................. | E05F 15/73 |
| | | | | 701/49 |
| 2016/0036964 A1* | 2/2016 | Barfield, Jr. | ............ | H04W 4/40 |
| | | | | 455/418 |
| 2018/0208204 A1* | 7/2018 | Chen | ........................ | G06F 1/163 |
| 2018/0290626 A1* | 10/2018 | Wagatha | ............... | B60R 25/241 |

FOREIGN PATENT DOCUMENTS

| | | |
|---|---|---|
| DE | 102010010057 A1 | 9/2011 |
| DE | 102013220240 A1 | 4/2015 |
| DE | 102012020414 A1 | 4/2017 |
| DE | 102016220126 A1 | 5/2017 |
| DE | 102015016558 A1 | 6/2017 |
| DE | 102017105786 A1 | 9/2017 |
| DE | 102016218351 A1 | 4/2018 |
| DE | 102017222900 A1 | 7/2018 |
| DE | 102018003788 A1 | 11/2018 |
| WO | 2014/086763 A1 | 6/2014 |

\* cited by examiner

RECOGNIZING AUTHORIZED VEHICLE USER WITH MOVEMENT DATA

REFERENCE TO COPENDING APPLICATIONS

This patent application claims priority to German patent application DE 10 2018 222 761.6, which was filed on Dec. 21, 2018, the entire disclosure of which is hereby incorporated by reference.

TECHNICAL FIELD

This patent document relates to a method for recognizing a vehicle user, and more particularly, to recognizing a vehicle user with movement data of a sensor identification circuit.

BACKGROUND

Traditional mechanical car keys are inserted into a lock cylinder to lock or unlock a vehicle door, or inserted into the ignition lock cylinder to start the engine, turn on the vehicle accessories, and unlock the steering wheel. However, these mechanical car keys are increasingly being supplemented or replaced by remote keys, which may be used to lock and unlock the doors by remote control through the touch of a button. Now there are some keyless locking systems that enable a vehicle to be unlocked without actively using a car key when the key of the vehicle is detected in the immediate vicinity of the vehicle. Some of these keyless systems enable a car to be started by merely pressing a start button when the key is in the vehicle. Such keyless systems have a chip that receives a wireless signal from the vehicle, and in response thereto sends a return signal embodying identifying information back to the vehicle. If the identifying information embodied in the return signal is authenticated, the vehicle may be opened and, if equipped with keyless ignition, started.

There also have been efforts to program and enable mobile phones to function as a digital vehicle key. These are based on the operation of classic vehicle radio remote controls. The smartphone stores an encrypted digital key or similar code. Upon receiving the digital key from the smartphone and then validating it, the vehicle will perform or enable functions associated with the digital key. For example, upon receiving a valid digital key, the vehicle may unlock the doors, disable the immobilizer, or even enable ignition by pressing the vehicle's start button.

Such keyless vehicle control systems have advantages such as convenience for the user. However, they present many problems as well. Because the vehicle recognizes only the transmitter (e.g., radio key, smartphone) for the keyless vehicle control system, whoever has possession of it can access and operate the vehicle even if they are not authorized to do so, which is a problem if someone finds or steals a lost transmitter. Hackers also present problems for keyless vehicle control systems. Hackers have developed systems to circumvent these systems, which enable them to break into or even steal cars and other vehicles.

There have been different attempts to solve these known problems with keyless vehicle control systems. Some examples utilize biometric data for authenticating or identifying authorized persons. Various biometric methods may be used for this purpose. Face recognition or iris recognition may take place with the aid of a camera and subsequent image processing. Other biometric systems that can be used to authorize access to, or use of, a vehicle include venous scanners that evaluate the course of veins in the person's hand, a speaker authentication of speech signals, and fingerprint sensors.

However, such biometric access systems require special hardware components for recording biometric data. If these hardware components are integrated into the vehicle, it may be necessary to double the design of the biometric evaluation systems in order to be able to separately authorize both vehicle access from the outside and disablement of the electronic immobilizer so the person can start the engine and operate the vehicle. This extra hardware will lead to significant additional costs in the production of the vehicle. In addition, the vehicle user is forced to repeat this authorization procedure with each access to the vehicle and with each start of the engine.

There also have been attempts to develop a system that evaluates the gate or other movements of the vehicle user. Examples include systems that video record an image of a user while the user moves and then analyzes the image. Other example systems include wristbands or other sensors that attempt to determine a vehicle user's gate. However, the current systems suffer from many shortcomings such as expensive hardware, the need for remote sensors such as wristbands, the need for redundant sensors, inaccuracies, and the difficulty of distinguishing between different people and between different movement patterns.

SUMMARY

In general terms, this patent document is directed to recognizing a vehicle user with the aid of the movement data that correspond to a vehicle user's movement. An aspect of authentication is a sensor identification circuit having at least one sensor for gathering movement data. Another aspect of authentication is a learning system that analyzes the movement data, and controls a vehicle in response to the learning system determining the movement data recognizes the vehicle user.

DETAILED DESCRIPTION

Figure 1:
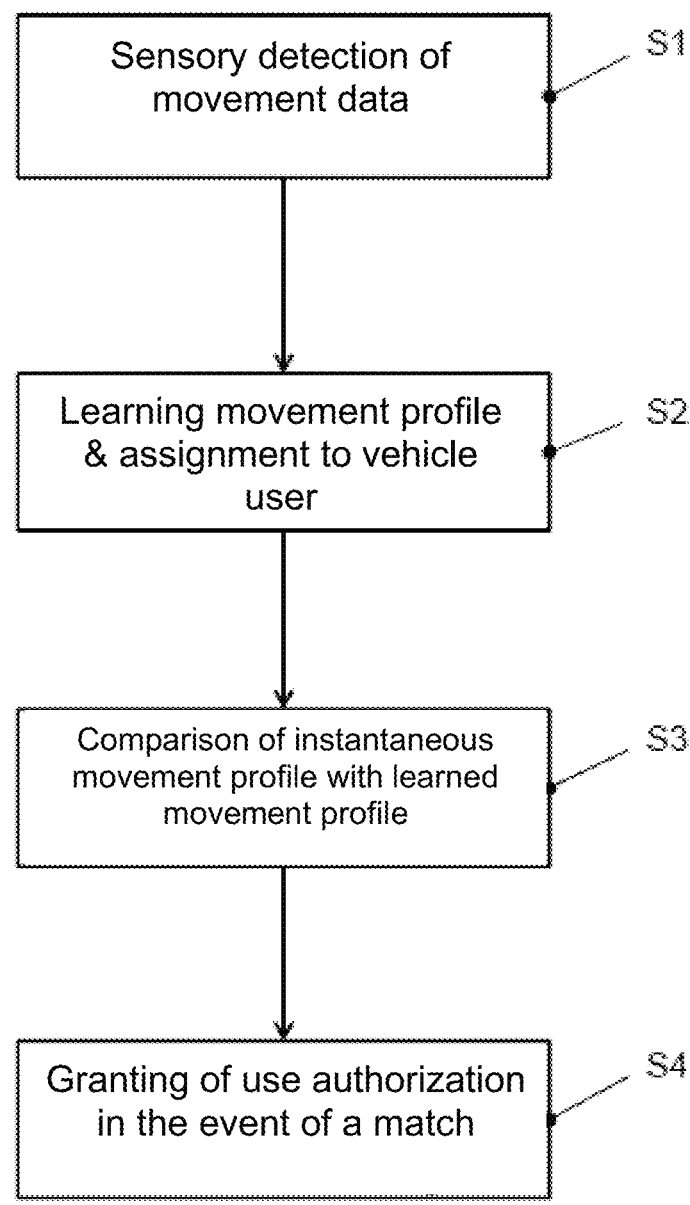
FIG. 1 shows a flow chart for a method of recognizing a vehicle user with the aid of the movement data of a sensor identification circuit.

Various embodiments will be described in detail with reference to the drawings. Reference to the drawings and various embodiments in this written specification does not limit the scope of the claims attached hereto. Additionally, any examples set forth in this written specification are not intended to be limiting and merely set forth some of the many possible embodiments for the appended claims.

For purposes of this patent document, the terms "or" and "and" shall mean "and/or" unless stated otherwise or clearly intended otherwise by the context of their use. Whenever appropriate, terms used in the singular also will include the plural and vice versa. Use of the term "a" means "one or more" unless stated otherwise or where the use of "one or more" is clearly inappropriate. Use of the term "or" means "and/or" unless stated otherwise. Use of the terms "comprise," "comprises," "comprising," "include," "includes," "including," "having," and "has" are interchangeable and are not intended to be limiting. For example, the term "including" shall mean "including, but not limited to." The term "such as" also is not intended to be limiting.

All ranges provided herein include the upper and lower values of the range unless explicitly noted. Although values are disclosed herein when disclosing certain exemplary embodiments, other embodiments within the scope of the pending claims can have values other than the specific values disclosed herein or values that are outside the ranges disclosed herein.

Terms such as "substantially" or "about" when used with values or structural elements provide a tolerance that is ordinarily found during testing and production due to variations and inexact tolerances in factors such as materials and equipment. These terms also provide a tolerance for variations due to environmental conditions such as temperature and humidity. Such variations also can be due to normal wear and tear over the life of apparatuses that embody the appended claims.

The recognition of an authorized vehicle user involves one or more sensors that sense movement of the vehicle user and that output sensor signals embodying movement data, which is data that represents or corresponds to movement of a person. The movement data is input to a learning system, which generates a movement profile. The movement profile provides a movement signature of the vehicle user that can be used to recognize the user. After a movement profile is generated, the learning system can process the movement data and determine whether the vehicle user is an authorized vehicle user. A vehicle user can be a driver, a person just seeking access to the vehicle, or any other person seeking to interact with the vehicle in some way.

Recognizing the vehicle user has many technical and functional advantages. Various operations of the vehicle can be automated. Various operations of the vehicle also can be limited or restricted based on an authorization or authentication level of the recognized user. The automation enabled by or triggered by recognizing a vehicle user can increase comfort and convenience. The automation enabled by or triggered by recognizing a vehicle user also can provide limits on vehicle use and increase safety for different types of vehicle users such as children, new and inexperienced drivers, employees who drive fleet vehicles, and vehicle users driving a rented vehicle.

For example, a recognized vehicle user can be authorized to access the entire vehicle, and the vehicle doors can be automatically unlocked. A recognized vehicle user can be authorized to access only a certain portion of a vehicle such as the cabin, the trunk, some other portion of the vehicle, or a combination thereof. The electronic immobilizer can be automatically disabled and the vehicle automatically started. Use of a vehicle can be limited to only determined days or only at determined times of the day. Driving can be limited to driving only under a certain speed limit. Driving can be limited to a geographic area, and if the vehicle travels outside of the approved geographic area, the vehicle might take a determined action such as generating and broadcasting an alarm, or takeover control and autonomously drive back into the determined geographic area. The use of certain aspects or components of a vehicle such as the radio or other electronics can be controlled or restricted. For example, the radio can be disabled or the volume of the radio can be limited to a maximum volume. In yet another example, upon identifying a recognized user, the vehicle can adjust the position or setting of various vehicle components such as the seat position, mirror position, peddle position, steering wheel and steering column position, temperature settings, or radio presets. There are many other examples of vehicle automation or use restrictions that can be implemented based on recognizing or identifying the vehicle user.

Referring now to the drawings, FIG. 1 is a flow diagram illustrating a method for recognizing a vehicle user. In operation S1, movement data from a sensor identification circuit is input to a neural network. Movement data corresponds to movement characteristics such as step frequencies, length of stride, the force of a person's foot against the ground when stepping, step counts, pace, rate of walking or movement, rotation, geographic location, altitude, acceleration, route vectors, and movement patterns corresponding to riding an elevator, or climbing or descending stairs.

The movement data is generated by one or more sensors that respond to movement of a vehicle user. The sensor identification circuit can be any suitable electronic device that is mobile and can carry sensors. Examples include a key fob, mobile smartphone or other phone, smart watch or other wristband, data goggles or other eyewear, and smart clothing. In example embodiments, the sensors can be sensors for measuring movement, acceleration, proximity, global position, or any other type of sensor that can be used to detect movement. Examples of such sensors include accelerometers for measuring movement and acceleration, magnetometers for measuring alignment with the geomagnetic field, receivers for the global positioning system (GPS), cameras for recording images that can be analyzed with image recognition algorithms, hall-effect sensors for measuring magnetic fields, altimeters, light sensors, clocks, or radio signal strength sensors. In example embodiments, the sensor identification circuit can be mounted on the vehicle. For example, cameras or other imaging sensors can detect movement of a vehicle user. In yet other example embodiments, the imaging sensor circuit can include sensors mounted both in a mobile electronic device and on the vehicle.

Additionally, the vehicle can have multiple sensors that receive a signal from a mobile sensor identification circuit and then triangulates the signal to determine the location vector of the mobile sensor identification circuit. In example embodiments, as discussed in more detail herein, this location information corresponds to the position of the vehicle user relative to the vehicle and can be used to recognize the vehicle user. It also can be used to automatically control the vehicle in determined ways such as unlocking the driver door if the recognized vehicle user is proximal to the door.

In operation S2, the movement data from the sensors are subdivided into short time sequences, which are then input to the learning system for processing. The learning system processes the movement data to learn one or multiple movement profiles or patterns of movement of the vehicle user in the context of the vehicle. Each movement profile provides a signature that identifies a vehicle user. In example embodiments, each vehicle user can have multiple movement profiles. Examples of such movement profiles include the vehicle user's movement after parking and leaving the vehicle, and the vehicle user's movement toward the vehicle upon returning to the vehicle.

The time period between departure and return of the vehicle user from and to the vehicle may encompass an arbitrary length of time such as a few minutes, several hours or days, or even a longer period of time. A vehicle user might have different movement characteristics depending on the time of day or even the day of the week. For example, a vehicle user might have a longer, quicker stride when well rested in the morning and have a slower, shorter stride at the end of the day when tired. The vehicle user's movement characteristics also might depend on parking location. For example, parking locations can be near the vehicle user's apartment or home, near the vehicle user's workplace, or any other location. Like the time of day, movement characteristics such as the length of the vehicle user's stride or pace may vary from location to location. Moving up or down in altitude is another movement characteristic that can be used to identify and authenticate a vehicle user. For example, the vehicle user also may have to change altitude by traversing a stairwell or riding an elevator to move between their vehicle and a particular destination such as an office. Accordingly, the learning system can learn and store two or more movement profiles for a vehicle user and associate each movement profile to certain times, locations, or events. In exemplary embodiments, the learning system can learn movement profiles for multiple vehicle users and then assign each learned movement profile to the respective vehicle user. In other exemplary embodiments, the learning system can generate new movement profiles for a vehicle user over time or generate new movement profiles for new vehicle users. In yet other exemplary embodiments, the learning system can update or refine existing movement profiles as it continues to learn the vehicle user's movement characteristics.

The learning system is an electronic processing system that includes one or more processing units. The processing units can be a central processing unit, a graphical processing unit, or a combination thereof. These processing units are physical devices or articles of manufacture comprising one or more integrated circuits that selectively execute software instructions. In various embodiments, the authentication processing system is implemented in various ways. For example, the authenticating processing system can be implemented as one or more processing cores. In another example, the processing system can include one or more separate microprocessors. In yet another example embodiment, the processing system can include an application-specific integrated circuit (ASIC) that provides specific functionality. In yet another example, the processing system provides specific functionality by using an ASIC and by executing computer-executable instructions. The processing units can be located in a single device such as the vehicle, or distributed between different locations.

Additionally, example learning systems have non-volatile or non-transient memory and volatile memory. Examples of non-volatile memory include hard drives, solid-state drives, magnetic storage mediums and devices, and optical storage mediums and devices. Examples of volatile memory include various types of random access memory (RAM) that can be used for cache or other purposes. The memory can be located in a single location, located in different locations, or even located in a location separate from the processing units. For example, the processing units can be distributed between the vehicle, the sensor identification circuit, and a remote server that can be accessed over the Internet.

In example embodiments, the learning system is programmed with and executes machine-learning algorithms to analyze the movement data. In example embodiments, the learning system comprises one or more neural networks. The neural network can be an artificial neural network. Other example embodiments can include other configurations of circuits, processors, and algorithms for analyzing the movement data.

In operation S3, the vehicle user's approach to the vehicle is detected. The approach is detected as the sensor identification circuit approaches the vehicle. Sensors in the sensor identification circuit output a sensor signal that embodies the movement data. The movement data generated by the sensors is downloaded to the learning system and input to the machine-learning algorithm. The downloaded movement data is compared with the known, previously learned movement profiles of recognized vehicle users.

If the movement data matches the movement profile assigned to a vehicle user, operation S4 determines that the sensor identification circuit is being carried by an authorized vehicle user. As discussed herein, the vehicle will then automatically perform or enable the operations assigned to the recognized vehicle user and the matched movement profile. For example, access to the vehicle will be granted or the vehicle will be started. Similarly, restrictions on use of the vehicle will be imposed as those restrictions are assigned to the recognized user. For example, the speed of the vehicle might be governed or limited to a determined speed limit.

Figure 2:
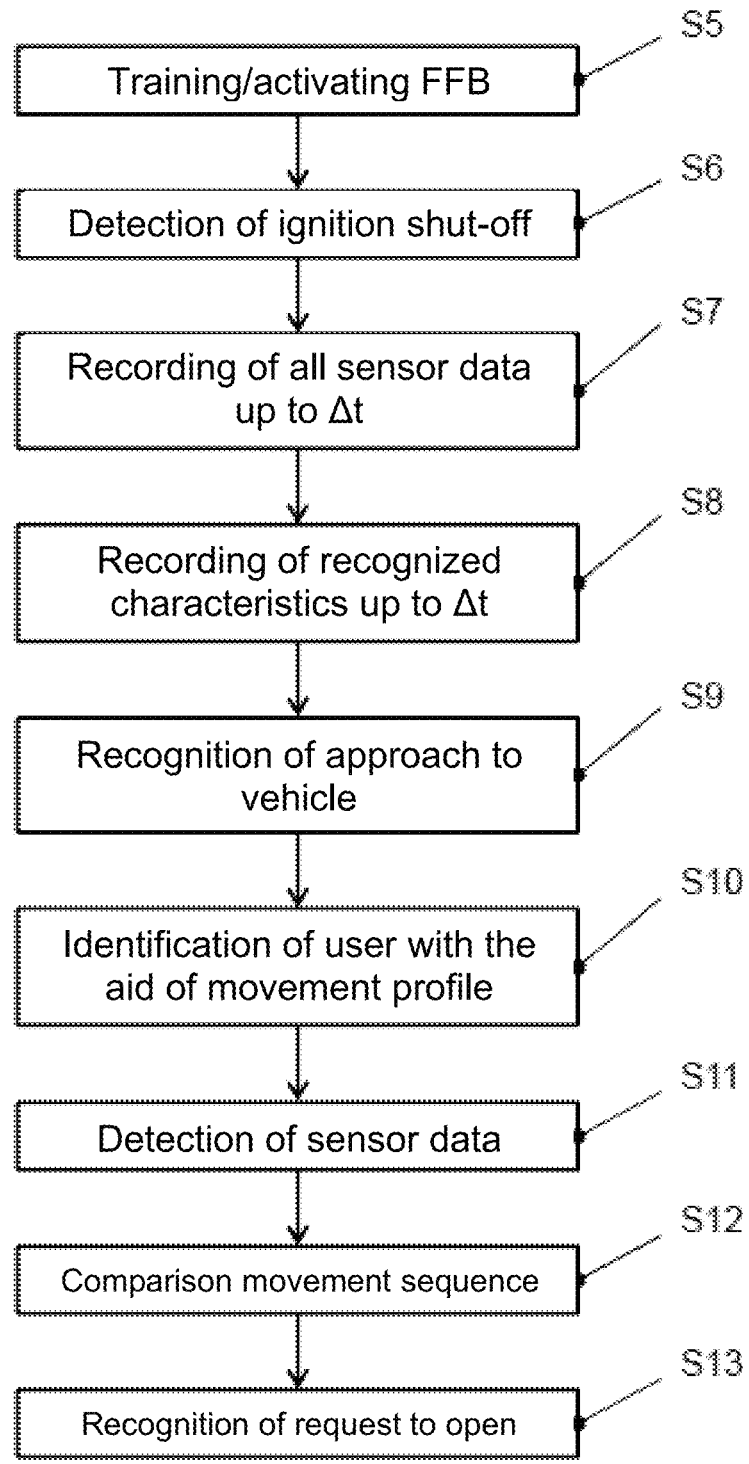
FIG. 2 shows a more detailed flow chart for the method illustrated in FIG. 1.

Referring now to FIG. 2, before the system is able to recognize a vehicle user, it must learn or generate movement profiles based at least in part on movement data generated by the sensor identification circuit. The movement data generated by the sensor identification circuit corresponds to movement of the vehicle user.

In operation S5, the sensor identification circuit is activated after a vehicle is transferred to a buyer. In an example embodiment, activation can occur when a button on the key fob or other sensor identification circuit is pressed to unlock the vehicle and the vehicle is started. In alternative embodiments, the sensor identification circuit can be activated by performing a different set of operations. For example, the sensor identification circuit can be activated by pressing the button or buttons on the sensor identification circuit in a determined pattern, pressing buttons on both the sensor identification circuit and on the vehicle together or in a determined pattern, or entering an identification code into the sensor identification circuit or into the vehicle's computer.

In operation S6, the sensor identification circuit detects when the engine of the vehicle is turned off. After the vehicle is shut off, the sensor identification circuit enters into a near-field recognition mode at operation S7. In the near-field recognition mode, the sensor identification circuit monitors the sensors in the sensor identification circuit and records or stores all of the movement data output by the sensors. In example embodiments, the movement data is transmitted to the vehicle for storage or to third-party storage connected to the Internet. Movement data also can be stored in a combination of memory in the sensor identification circuit, memory onboard the vehicle, or third-party memory. In other example embodiments, the sensor identification circuit records less than all of the movement data output by the sensors when in the near-field recognition mode.

In example embodiments, recording the movement data begins upon the vehicle user's departure from the driver's seat and lasts a period $\Delta t$. Alternatively, the sensor identification circuit begins recording data as soon as the vehicle is shut off rather than upon the vehicle user's exit from the vehicle. In an example embodiment, $\Delta t$ is in the range from about 10 seconds to about 50 seconds. In other example embodiments, Δt can be less than about 10 seconds. In yet other example embodiments, Δt can be greater than about 50 seconds. In addition, Δt can vary from vehicle user to vehicle user. In example embodiments, the period Δt for this immediate vicinity detection depends on the time that a vehicle user spends in the immediate vicinity of the vehicle before leaving the area. For example, if the sensors detect a very slow movement indicating the vehicle user is disabled, it might record movement data for a longer period of time so that there is a data set covering the vehicle user's movement an adequate distance from the vehicle. In other example embodiments, the learning system can automatically adjust the period of time Δt for sensing and recording movement data.

After expiration of Δt, the sensor identification circuit enters a home-recognition mode at operation S8. In the home-recognition mode, the sensor identification circuit stops recording all movement data and begins to record only movement data characteristic of determined movement patterns. Examples of movement data characteristic of determined movement patterns that are recorded in the home-recognition mode include riding an elevator, climbing or descending stairs, rotation, and route vectors. The recorded movement data is given a time stamp. Rest periods also may be recorded as an additional characteristic. In an example embodiment, when recording rest periods, the sensor identification circuit stores only the duration of each rest period. An advantage of storing only the duration of the rest period is that storing a value for the time period instead of movement data corresponding to continuous detection provides saving of memory and other processing resources.

In operation S9, the vehicle periodically transmits a ping signal. When the vehicle user returns to the vehicle and the sensor identification circuit gets close enough to the vehicle, it will receive the ping signal and then return an acknowledgement signal in response thereto. When one or more radios on the vehicle receive the acknowledgement signal, the vehicle returns to the sensor identification circuit a signal carrying an encrypted code. The processor in the sensor identification circuit decrypts the returned code and if it matches the code stored in the sensor identification circuit, the sensor identification circuit determines it is near its assigned vehicle and will enter the near-field mode. In alternative embodiments, the sensor identification circuit can periodically send a ping signal, and the vehicle then returns the encrypted code to the sensor identification circuit in response to receiving the ping signal.

In operation S10, the learning system determines whether the vehicle user is recognized as an authorized vehicle user after the sensor identification circuit is in the vicinity of the vehicle and it enters the near-field mode. In this operation, the movement data that has been stored in the sensor identification circuit while it is in the home-recognition mode is downloaded to the learning system, which processes the downloaded movement data to determine whether it matches an existing movement profile for a vehicle user. The vehicle user is recognized as an authorized vehicle user if there is a match. For example, if the downloaded movement data and a stored movement profile both correspond to a determined movement pattern such as riding an elevator at a determined location at a determined time of day, the vehicle user will be deemed a recognized vehicle user. In example embodiments, the determination of whether the vehicle user is an authorized vehicle user is determined based only on whether the movement data recorded in the home-recognition mode corresponds to a determined movement pattern such as riding an elevator or taking a determined route to the vehicle. In other example embodiments, the determination of whether the vehicle user is an authorized vehicle user is determined based on both movement data corresponding to determined movement patterns recorded in the home-recognition mode and all of the movement data (e.g., vehicle user's stride) recorded in the near-field recognition mode. In yet other example embodiments, the only movement data generated while the sensor identification circuit is in the near-field mode is used to determine whether the vehicle user is an authorized vehicle user.

In operation S11, the learning system begins again to record all of the movement data, not only the movement data corresponding to determined movement patterns that are recorded when then sensor identification circuit is in the home-recognition mode. All of the movement data also is downloaded from the sensor identification circuit to the learning system when the sensor identification circuit returns to the near-field mode. In example embodiments, movement data generated by the sensor identification circuit after it returns to the near-field mode is downloaded to the learning system in real time or near real time. In other example embodiments, movement data generated after the sensor identification circuit returns to the near-field mode is recorded before it is downloaded to the learning system. In yet other example embodiments, the movement data generated after the sensor identification circuit returns to the near-field mode is downloaded before execution of operation S10. In yet other example embodiments, the movement data is downloaded after execution of operation S10.

In example embodiments, the learning system processes this newly downloaded movement data to refine the existing movement profiles for the recognized vehicle user. Refining the existing movement profiles can increase the accuracy of the learning system when determining whether the person carrying the sensor identification circuit is an authorized vehicle user. In yet other example embodiments, the learning system uses the downloaded movement data to generate new movement profiles for the vehicle user.

In operation S12, the movement data generated while the sensor identification circuit is in the near-field mode is compared to stored movement profiles that correspond to the recognized vehicle user's known movement sequences near the vehicle. If the downloaded movement data recorded while the sensor identification circuit is in the near-field mode matches an existing movement profile, operation S13 will control the vehicle according to vehicle operations that are associated with the matched movement profile. For example, if in previous uses of the vehicle, his/her approach to the driver's door is followed by a rotational movement in the direction of the driver's door immediately before entering the vehicle, then this rotational movement may be recognized as a request by the vehicle user to open or unlock the driver's door. The driver's door then is automatically opened or unlocked. Any other manner of approaching the vehicle is not recognized as a request to unlock the door unless it matches another movement profile associated with the vehicle user and an unlocking operation. Although operation S13 is illustrated as opening the door, this operation is just an example of how the vehicle can be controlled through the recognition of movements made by the vehicle user. Examples of other operations that can be associated with the vehicle user's movement profiles include unlocking only the driver's door, unlocking all of the passenger doors, unlocking or opening the vehicle hatch (e.g., trunk, tailgate), automatically starting the vehicle, enabling speed limiters or governors, enabling geographic alarms, and operating vehicle components based on pre-programmed settings (e.g., seat positions, preset radio stations, mirror positions).

In operation S13, the learned movement sequences are intended to reflect a user's request to control the vehicle in a determined way. In example embodiments, such movement sequences are not predefined by the vehicle manufacturer, but are learned individually for each authorized vehicle user by detecting the user's movement behavior. For example, the controlling moving sequence might be automatically recognized because the vehicle user habitually rotates his/her body as they approach the vehicle door. However, the vehicle user may deliberately move the sensor identification circuit in a particular pattern each time they approach the vehicle. For example, the vehicle user could move the sensor identification circuit up and down in a quick motion, side to side, in a circle, or in any other determined pattern. The learning system will process the movement data generated during these movements and automatically generate a corresponding movement profile. Additionally, in example embodiments, the vehicle user could move the radio remote control in different patterns and program the system so that each pattern corresponds to a different command. For example, one movement pattern might correspond to only opening or unlocking the doors and a different pattern might correspond to both opening the doors and automatically starting the vehicle's engine.

Figure 3:
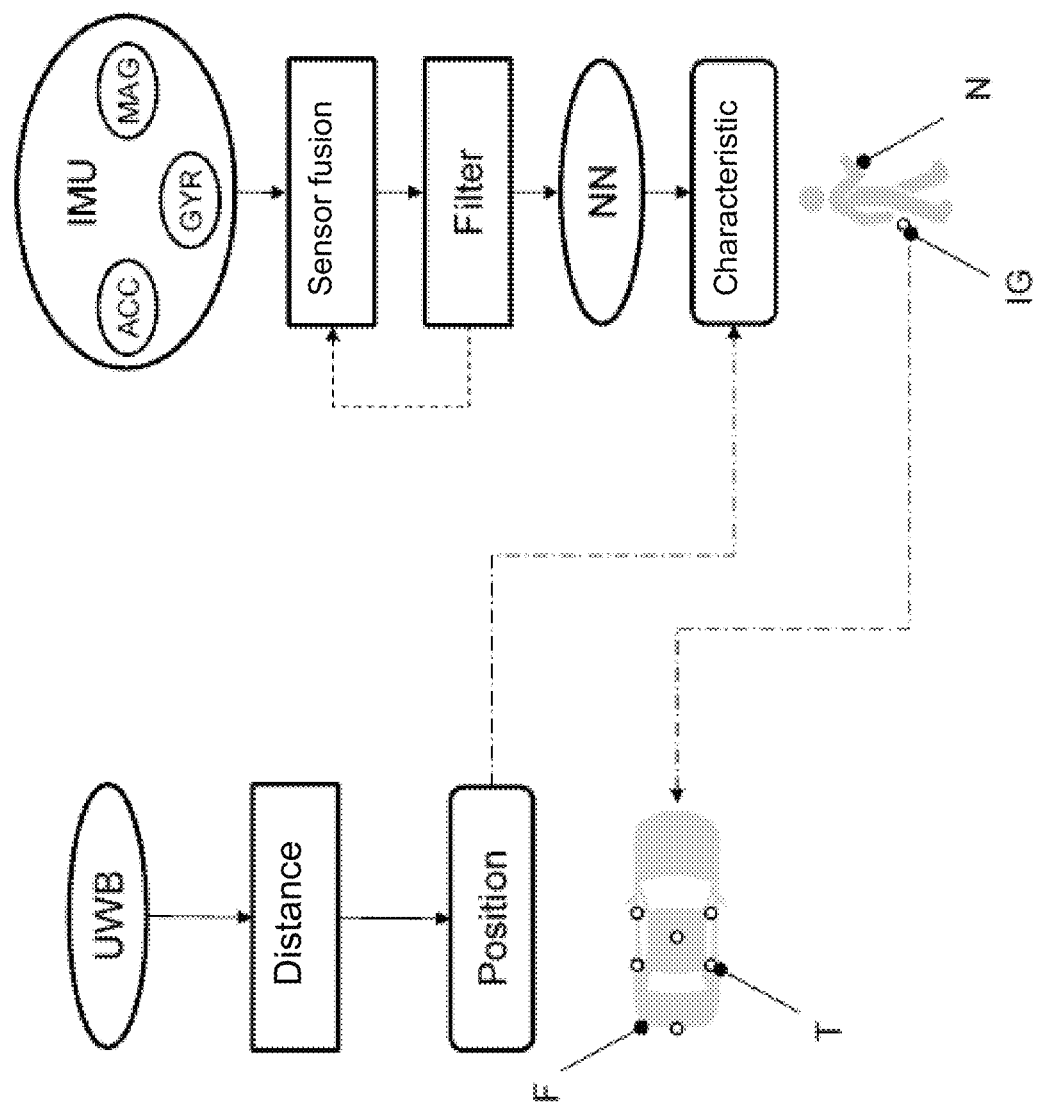
FIG. 3 schematically illustrates a system that detects the distance and position of a vehicle user carrying the sensor identification circuit and determines movement characteristics useful for recognizing the vehicle user according to the methods illustrated in FIGS. 1 and 2.

FIG. 3 illustrates detecting the distance and position of the sensor identification circuit relative to the vehicle. It also illustrates determining characteristics of the sensor identification circuit's movement and the identity of the vehicle user.

A vehicle F has a radio system with multiple radio components T that include ultra wide band (UWB) transmitters and UWB receivers, which function as radio tags or anchors. The sensor identification circuit IG also has UWB receivers and transmitters so it can communicate with the radio system in the vehicle F. UWB technology enables data to be exchanged with low transmission output in the immediate vicinity of the vehicle F and is particularly well suited for a position determination in the vehicle surroundings due to its robustness against interferences and the high data rates at which it can transmit and receive data. Measuring the propagation time of the radio waves between the sensor identification circuit IG and two or more of the radio components T and then triangulating the radio waves enables the system to determine the position vector (e.g., distance and angular position) of the sensor identification circuit IG relative to the vehicle F. The position vector may be ascertained with a high degree of accuracy in the immediate vicinity of the vehicle F, but may be limited to a distance from the vehicle F of a few meters. Other wireless technologies such as wireless local area network (WLAN) technology or Bluetooth® technology may be used instead of UWB.

In example embodiments, the radio components T in the example shown in FIG. 3 are situated on each of the vehicle doors, on the rear console in the vehicle cabin, and on the center console in the vehicle cabin. In this case, the use of multiple radio components T in the vehicle F enables accurate triangulation to determine the position of the sensor identification circuit IG. Multiple radio components T also ensure that an interference-free radio connection between the radio system in the vehicle F and the sensor identification circuit IG is possible, regardless of the instantaneous position of the vehicle user N near the vehicle F.

In addition, the position and movement of the sensor identification circuit IG, and thus also of the vehicle user N, is ascertained via sensors positioned in the sensor identification circuit IG. Example embodiments of the sensor identification circuit IG include an inertial measurement unit (IMU), which includes a combination of multiple sensors. Examples of sensors included in the IMU are an acceleration sensor (ACC), a gyroscope (GYR), a magnetic field sensor (MAG), other types of sensors as discussed herein, or combinations of these or other types of sensors. In example embodiments, data from the various sensors are combined via a sensor fusion process and subsequently filtered for further processing by the neural network NN. The filter eliminates unimportant and unwanted components such as noise and anomalies in the signal generated by the sensors. Filtering also can be used to select only the components of the signal that are relevant to processing by the neural network NN. For example, an application might not use output from the gyroscope and so the filter would filter the signal components corresponding to the gyroscope before the signal is input to the neural network NN. Additionally, the filtered signal output from the filter is fed back into the sensor fusion process.

When the vehicle user N moves away from or toward the vehicle F, movement data and positional data are generated and recorded. Movement data generated when the vehicle user N moves in the immediate vicinity of the vehicle F also is recorded and processed by the learning system. When the vehicle user N is in the immediate vicinity of the vehicle F, the movement profile generated with the movement data recorded while the vehicle user N is in the vicinity of the vehicle F may be correlated or otherwise related to the positional data ascertained by the radio components T. For example, the vehicle user N may rotate his/her body one way when approaching the driver door and rotate in a different way when approaching a passenger door or the vehicle trunk. In these example embodiments, when the movement data relates to a movement profile that in turn is related to positional data, the learning system can determine that the vehicle user N is in the position defined by that position data. For example, the learning system can determine whether the vehicle user N is located near the driver's door, near one of the other doors, near the rear hatch, or in another area when the matching movement profile is correlated to the relevant position vector. In other example embodiments, the learning system processes the movement data and determines whether the vehicle user N is a recognized vehicle user independent of the vehicle user's position.

Figure 4:
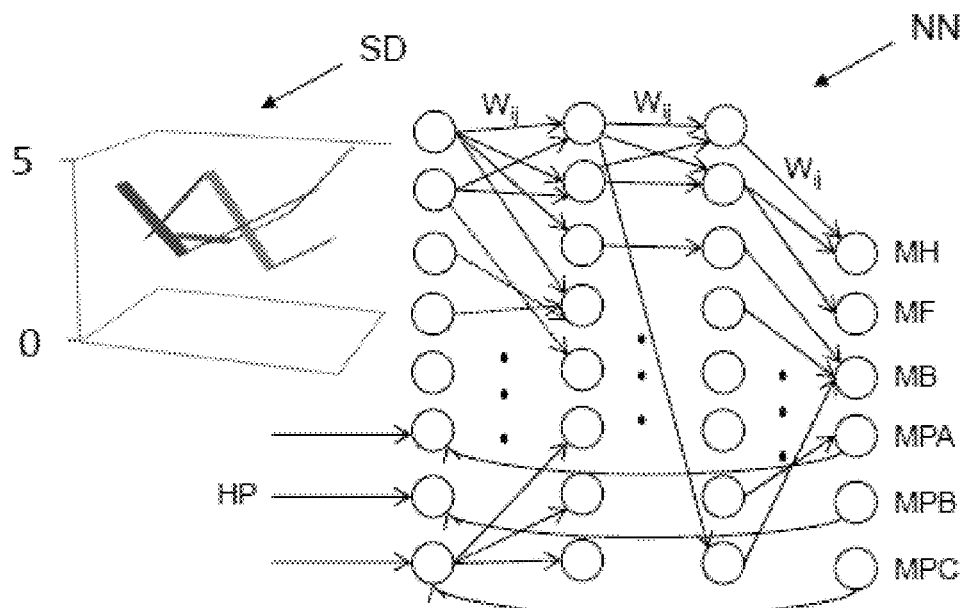
FIG. 4 schematically illustrates a neural network that determines movement characteristics according to the methods illustrated in FIGS. 1 and 2.

FIG. 4 illustrates an example neural network NN that can be used in the learning system. An example of a neural network NN that can be used includes a multilayered long short-term memory (LSTM) network. The neural network NN in this case is based on linked artificial neurons, which are able to process multiple inputs, each of which may be weighted individually with weights Wij. The weights Wij determine the degree of influence that the inputs of the neuron have in the calculation of an activation of the neuron. In the illustrated example, the artificial neurons are situated in multiple successive layers, with two hidden layers between the input layer and the output layer, although there can be more or fewer than two hidden layers of neurons. Each movement profile associated with a vehicle user N is formed with a different combination of weights Wij.

The neural network NN receives the movement data SD as input data. Past movement data HP of the respective user N that was previously generated also is fed to inputs of the neural network NN for training the neural network NN. In an example embodiment, the data from each sensor is fed into a separate input of the neural network NN. For example, the data from an accelerometer is fed into one input and the data from a gyroscope is fed into a different input. If there are two accelerometers, the data from each accelerometer is fed into separate inputs. In example embodiments, the location vector of the vehicle user N also is fed to an input of the neural network NN. The data input to the neural network NN passes through the layers of neurons, the first layer being the inputs and the last layer being the outputs. In an example embodiment, the neural network NN has multiple outputs. Examples of outputs include identifying outputs, positional outputs, or a combination of both positional and identifying outputs. Identifying outputs indicate the likelihood the vehicle user N is a recognized vehicle user. Positional outputs indicate the likelihood a vehicle user N is at a particular position relative to the vehicle F.

The outputs identify the likelihood that the movement data corresponds to a movement profile for a recognized vehicle user N. In example embodiments, each output is a value on a scale between 0 and 1. The higher the value of the output, the more likely the vehicle user N is a recognized vehicle user. For example, a zero or very low value indicates a low probability the movement data input to the neural network NN matches a movement profile belonging to a recognized vehicle user N. A value of 1 or a value close to 1 indicates a very high probability the movement data input to the neural network NN matches a movement profile belonging to a particular recognized vehicle user N. Similarly, if one or more movement profiles are related to a particular position of the vehicle user N, the neural network NN can include one or more positional outputs that determines the likelihood the matched movement profile is for a particular position. Each positional output would relate to a different position relative to the vehicle F.

The example neural network NN in FIG. 3 has three positional outputs and three identifying outputs. The illustrated examples of positional outputs include outputs indicating the vehicle user N is in a position near the rear of the vehicle MH, near the driver's door MF, or near the passenger door MB. In example embodiments, the positional output indicates the position of only recognized vehicle users, which would be person A, person B, or person C in the illustrated example. In example embodiments, the positional outputs indicate the position of any vehicle user N carrying the sensor identification circuit or that is otherwise located through the use of the tags T. The illustrated examples of identifying outputs include an output MPA indicating the likelihood the vehicle user N is recognized as person A, an output MPB indicating the vehicle user N is recognized as person B, and an output MPC indicating the vehicle user N is recognized as person C. To be able to identify an individual user with sufficient probability, the number of different users to be recognized can be limited. For example, the number of different vehicle users can be limited to a maximum of 5 to 10 different users. In other example embodiments, the neural network NN can accurately recognize more than ten different vehicle users.

Figure 5:
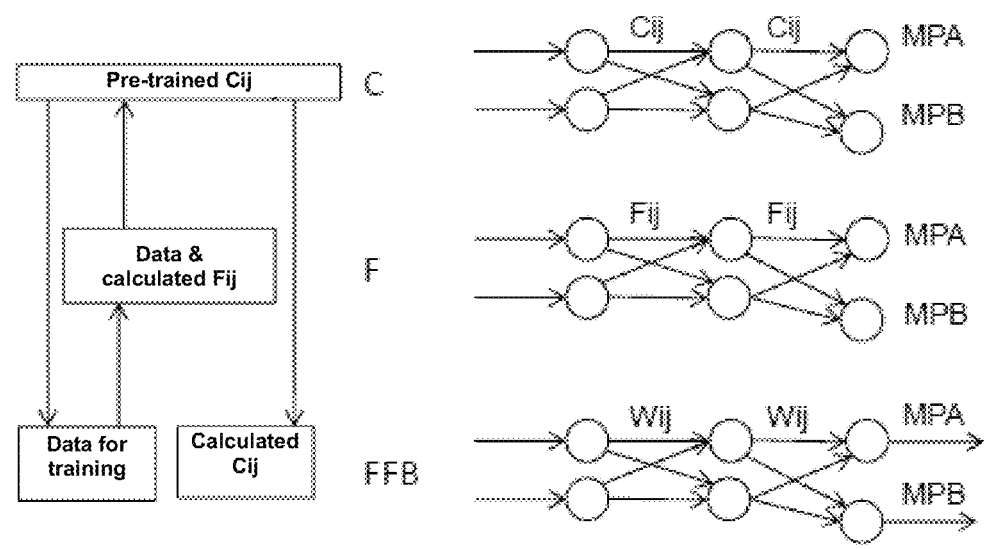
FIG. 5 schematically illustrates a learning phase of the neural network illustrated in FIG. 4.

FIG. 5 illustrates the learning phase of the neural network NN. In example embodiments, a centralized neural network NN is base in the cloud C. The centralized neural network NN is located at one or more facilities remote from the vehicle F. An advantage of having a neural network NN or other learning systems in the cloud C is that it can be built with a high level of computing power, and easily and economically upgraded with new hardware and software. Additionally, it enables the transfer of movement profiles and respective weights for a vehicle user N to multiple vehicles F and multiple sensor identification circuits IG. In this way, a vehicle user N is able to use his/her learned movement profiles in multiple vehicles F, or with multiple sensor identification circuits IG. It also enables generating and or optimizing the movement profiles of a vehicle user N based on the use of multiple vehicles F.

In example embodiments, the learning system also includes a local neural network NN onboard the vehicle V. As explained herein, having both a centralized and local neural networks NN has several advantages. For example, when the vehicle has no connection to the Internet, the local neural network NN can process the movement data and determine whether the vehicle user N has a movement profile. In another example, the local neural network NN also can update the weights for the neural network NN locally without connection to the Internet. Another example is that it is easier and less expensive to update the hardware and software at a centralized location than in potentially millions of vehicles F, which can be located around the world. Accordingly, the centralized neural network NN can be modified with upgraded hardware and software or code, which in turn can enable faster processing, more accurate calculation of neural network weights, and more accurate authentication of vehicle users.

Other example embodiments have only a centralized neural network NN or only a local neural network NN in the vehicle F. As computer technology advances, yet other example embodiments may be able to include a mobile neural network NN in the sensor identification circuit IG. The mobile neural network processing system can be in place of the local neural network processing system, in place of the centralized mobile neural network processing system, or in place of both the centralized and local neural networks NN. The mobile neural network processing system also may be able to coordinate processing of the movement data and calculation of the neural network weights with the centralized or local neural network processing systems as described herein.

In the example embodiment illustrated in FIG. 5, pre-trained weights Cij are initially calculated in the cloud C by the centralized neural network NN. In example embodiments, the pre-trained weights Cij are downloaded to local neural network NN when a vehicle user N first takes possession of a vehicle F and the vehicle F is connected to the Internet. The vehicle F then transmits or relays the pre-trained weights Cij to the sensor identification circuit IG. In example embodiments, when the vehicle user N unlocks the car for the first time, the pre-trained weight Cij and movement data that has been generated in the sensor identification circuit IG are downloaded from the sensor identification circuit IG to the vehicle F for further training. The local neural network NN uses the pre-trained weights Cij and any initial movement data downloaded from the sensor identification circuit IG to calculate neural network weights Fij.

Additionally, the sensor data and calculated weights Fij are transmitted through the cloud C to the centralized neural network NN. The weights Cij can be recalculated based at least in part on the weights Fij. A variety of data such as movement data from other vehicles F owned or used by the vehicle user N, positional data, and any other data that might be relative to increasing accuracy of the learning system and authenticating the vehicle user N also can be used to recalculate the weights Cij. The recalculated weights Cij are then uploaded to the vehicle F, which transmits them back to the sensor identification circuit IG.

The next time the sensor identification circuit IG enters the near-field mode the recalculated weights Cij and the most recent movement data is transferred to the vehicle F and processed by the local neural network NN to recalculate the weights Fij. The recalculated weights Fij are uploaded to the centralized neural network NN and the weights Cij are recalculated again. This process repeats each time the sensor identification circuit IG enters the near-field mode. In other example embodiments, this process is repeated only until the neural networks are trained to a high-level of accuracy (e.g., the output of the neural network is above a threshold level).

Storing the weights in the sensor identification circuit IG and then transmitting them with the movement data to the localized neural network NN in the vehicle F when it enters the near-field mode has several advantages. For example, several vehicle users N of the vehicle F can have their own sensor identification circuit IG. In this situation, the localized neural network has only the weights Fij or Cij for the current vehicle user N and does not need to store or keep track of weights for different people. An advantage is that in some example embodiments, the weights can be stored in two or more locations (e.g., sensor identification circuit IG, vehicle F, and cloud) to provide backup in case of data loss, which could occur in the event of a dead battery or other failure. Yet another advantage is that some sensor identification circuits IG (e.g., smart phone) can be paired with multiple vehicles. In this situation a vehicle user N who owns multiple vehicles F can use the same weights with each of his/her vehicles.

In other example embodiments, the pre-trained weights Cij and recalculated weights Cij can be transferred directly from the centralized neural network NN to the sensor identification circuit IG. In other example, embodiments, the neural network weights are not recalculated in the cloud, but rather they are stored in the cloud as data backup in case of data loss in the vehicle or stored in the cloud so they can be shared with other vehicles F used by the vehicle user N.

In other example embodiments, the weights Fij are transferred from the vehicle F back to the sensor identification circuit IG in addition to, or instead of, transferring them to the cloud C. An advantage of transferring the weights Fij to the sensor identification circuit IG is that the calculated weights Fij can be downloaded to the vehicle F and used by the local neural network NN in the event there is no Internet connection to the server in the cloud C and the recalculated weights Cij are not available.

In at least some embodiments, the learning system does not recalculate the weights based on newly downloaded movement data. For example, the output of the neural network NN might be over a threshold value (e.g., close to the value of 1) indicating the neural network NN is identifying the authenticated user N with a high degree of accuracy and does not need further refinement or optimization. In such a scenario, the learning system may not recalculate the neural network weights, which would conserve computing resources. Even if the learning system does not recalculate the weights based on the movement data, it may still store the movement data. In other embodiments, the learning system does not store the movement data if the neural network NN is able to authenticate the vehicle user N with a determined degree of accuracy.

The vehicle user N may continue to use the buttons on a key fob or other device to manually open the doors or operate the vehicle F after the neural network NN begins the learning phase. For example, if the vehicle F is opened by the vehicle user N near the vehicle F by pressing the corresponding button of the key fob, one reason may be that the movement sequence of the vehicle user N when approaching the vehicle F has not yet been fully learned by the neural network NN and the vehicle user N was not correctly recognized. In at least some embodiments, when this scenario happens, the movement data is downloaded and used by the neural network NN to recalculate the weights (e.g., Fij, Cij) and refine the movement profile for the vehicle user N. An advantage of these embodiments is that with each additional manual opening and closing of the vehicle F, the vehicle user's movement profile is steadily refined and the reliability of automatic vehicle access based on the movement profile is steadily improved.

Additionally, a situation may arise in which a vehicle user N cannot be unambiguously recognized. For example, the vehicle user's movements in the immediate vicinity of the vehicle F may be different than the recorded movement profiles due to injury or the vehicle user N wearing different footwear than they usually wear. In this situation, the learning process disclosed in this patent document may be carried out again. In example embodiments, to begin the learning process again, the vehicle user N manually opens the vehicle F again with the sensor identification circuit IG. Movement data corresponding to the vehicle user's modified movement characteristics of the vehicle user N are then used to recalculate the weights (e.g., Fij, Cij) and refine the movement profile. Alternatively, the learning system can generate a new movement profile for the vehicle user N that replaces the prior movement profile. In another alternative, the new movement profile for a vehicle user N is stored and used in addition to the vehicle user's prior movement profiles to authenticate the vehicle user N.

In example embodiments, the sensor identification circuit IG contains a security interface through which the vehicle user N must enter security data before the learning system enters the learning mode and begins generating a movement profile for the vehicle user N. Examples of security interfaces include an interface to enter a personal identification number (PIN), fingerprint readers, and cameras for facial recognition. A special application that receives and verifies the security data (e.g., PIN, fingerprint, facial scan) is loaded on the sensor identification circuit IG, and the creation of a movement profile is enabled if the received security data is verified. In alternative embodiments, the security interface or special application for enabling the creation of a movement profile may be installed on the vehicle F itself. A security interface can avoid abuse of the recognition system and can have several advantages. For example, the security interface prevents unauthorized people from creating a movement profile. A related advantage is that a vehicle user N can loan their vehicle F to a third party without risk the learning system will learn the third party's movement characteristics and interpret the vehicle user to be a recognized vehicle user N. Additionally, a movement profile can be linked to a vehicle user's security data. Linking a movement profile with security data enables the use of a sensor identification circuit IG to generate movement profiles for multiple vehicle users N. For example, a single sensor identification circuit IG could be used for multiple members of a family who share the vehicle F. Another advantage is that such security systems minimize the risk of theft or other abuse.

In at least some embodiments, feedback also may be given to the vehicle user N if the request to unlock the vehicle F or another function has been correctly ascertained and carried out. In at least some embodiments, for example, the sensor identification circuit IG has a haptic actuator that selectively delivers a tactile sensation to the vehicle user N.

Upon successfully unlocking the vehicle F, for example, the sensor identification circuit IG receives a confirmation signal and the haptic actuator is actuated in response to the confirmation signal. The haptic actuator delivers a tactile sensation to the vehicle user N.

In the example illustrated in FIG. 5, only the characteristics for the recognition of a first driver MPA or of a second driver MPB are shown for the sake of clarity. In other embodiments, the system can be programmed to recognize more than two vehicle users N. Various embodiments also can be programmed to recognize additional characteristics of an authorized vehicle user N other than the vehicle user's identity such as the vehicle user's position vector or position relative to the vehicle F. For example, a vehicle user N may have different movement profiles when approaching different sections of the vehicle F. For example, one movement profile might correspond to the vehicle user's approach to the driver's door and another movement profile might correspond to the same vehicle user's approach to the trunk.

Figure 6:
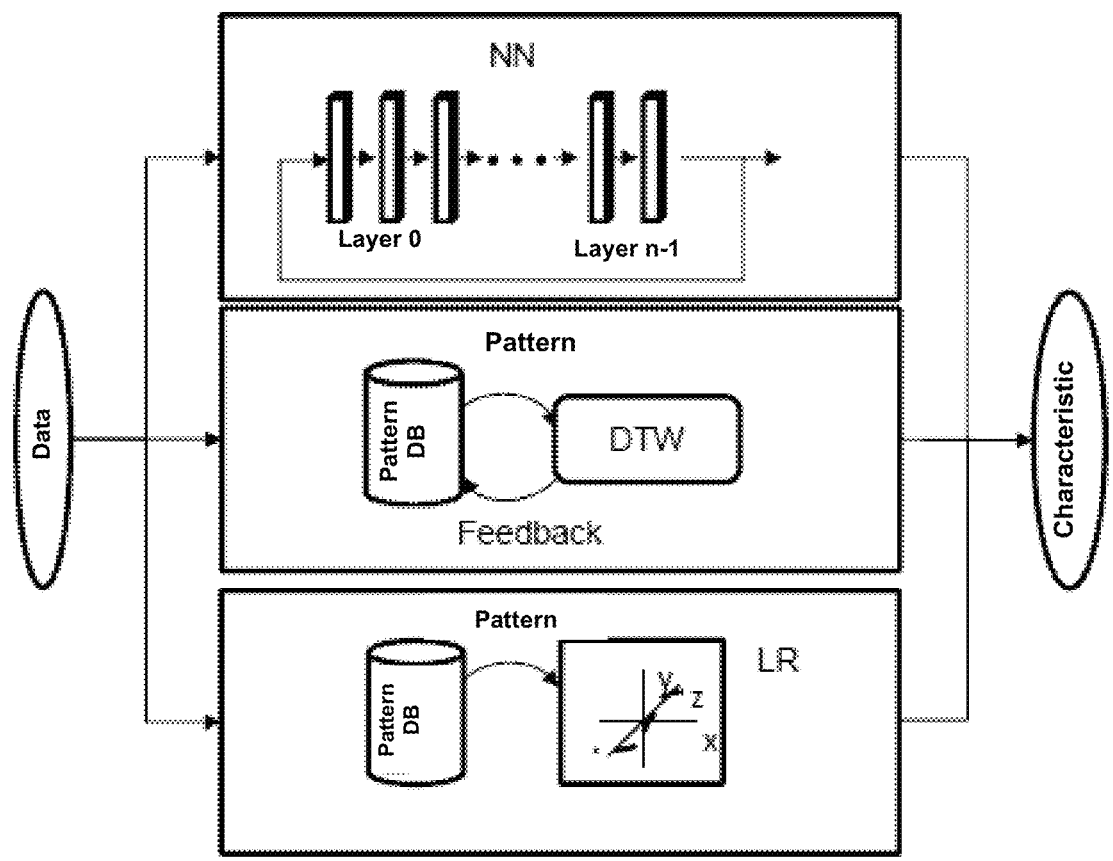
FIG. 6 schematically illustrates an operation and relationship between various components of the learning system and neural network illustrated in FIGS. 3-5.

FIG. 6 is a schematic illustrating the operation and relationship between various components of the learning system for processing movement data. The neural network NN has N layers in the illustrated example. In at least some embodiments, the neural network NN is a recurrent neural network in which the output of one or more neurons in one layer is fed back into one or more neurons in a previous layer. For example, the output of the neurons in the output layer could be fed back into the neurons of a previous hidden layer or into the input layer. Alternatively, the output of the neurons in a hidden layer could be fed back into the neurons of a previous hidden layer or into the input layer.

In at least some example embodiments, the neural network NN has a dynamic time normalization (i.e., dynamic time warping (DTW)) algorithm, which maps data sequences of different lengths to each other. In an example embodiment as discussed herein, the data in a dynamic time warp algorithm are divided into a series of short time samples for each sensor and each activity.

In example embodiments, the learning system also has a pattern database that classifies and stores templates of movement patterns that are classified by determined characteristics. The short time samples from each sensor are classified based on an assessment of their similarity to existing templates stored in the pattern database, and are classified according to their matching template. The samples in each classification are combined. When using this process of classifying and combining samples, only distinctive sensor signals are taken into account when processing the movement data. For each of the recognized patterns, a feedback about the relevance of the recognized pattern is also given back to a sample database.

Additionally, in at least some example embodiments, the neural network NN uses regression analyses LR on the movement data to determine which movement data should be meaningfully taken into account in the neural network's output data or to make an assessment of the neural network's output data. In at least some example embodiments, the neural network NN applies a sigmoid function, which has an s-shaped curve, to the data as an activation function for the artificial neurons.

The various embodiments described above are provided by way of illustration only and should not be construed to limit the scope of the claims attached hereto. Those skilled in the art will readily recognize various modifications and changes that may be made without following the example embodiments and applications illustrated and described herein, and without departing from the true spirit and scope of the following claims. It is intended that any such modifications and equivalents be included in the scope of the claims.

What is claimed is:

1. A method for authenticating a vehicle user with the aid of the movement data, comprising:
    receiving a movement profile for the vehicle user, wherein the movement profile comprises fused sensor data from a plurality of different sensor data associated with multiple layers of linked artificial neurons and vectors characterizing movements of the vehicle user;
    detecting the vehicle user's approach to a vehicle;
    obtaining movement data from the detected user's approach to the vehicle;
    determining that the movement data detected corresponds to the received movement profile; and
    authorizing at least one function of the vehicle for use by the approaching vehicle user.

2. The method according to claim 1, wherein determining that the movement data corresponds to a movement profile is performed after leaving and/or after approaching the vehicle before opening the vehicle.

3. The method according to claim 1, wherein the fused sensor data comprises sensed data in an immediate vicinity of the vehicle and outside the immediate vicinity.

4. The method according to claim 3, further comprising: detecting a distance and/or position of the vehicle user relative to the vehicle in the immediate vicinity of the vehicle, the detecting being detected by a propagation time measurement between at least one radio component integrated in the vehicle.

5. The method according to claim 4, wherein the radio components comprise ultra-wideband components (UWB).

6. The method according to claim 1, wherein the plurality of different sensor data comprises sensor data from at least two of acceleration sensors, gyro sensors, magnetic sensors, and combination thereof.

7. The method according to claim 1, wherein the fused sensor data comprises movement data divided into successive time samples.

8. The method according to claim 7, wherein the fused sensor data comprises a movement sequence of the vehicle user with respect to a location in the immediate vicinity of the vehicle.

9. The method according to claim 8, wherein determining that the movement data detected corresponds to the received movement profile comprises determining that movement data detected at the point in time of the approach correspond to a movement sequence.

10. A system for authenticating a vehicle user with the aid of the movement data, comprising:
    a processing apparatus;
    a vehicle sensor identification circuit, operatively coupled to the processing apparatus; and
    a memory for receiving a movement profile for the vehicle user, wherein the movement profile comprises fused sensor data from a plurality of different sensor data associated with multiple layers of linked artificial neurons and vectors characterizing movements of the vehicle user, wherein the processing apparatus, the vehicle sensor identification circuit and the memory are configured to
        detect the vehicle user's approach to the vehicle;
        obtain movement data from the detected user's approach to the vehicle;
        determine that the movement data detected corresponds to the received movement profile; and authorize at least one function of the vehicle for use by the approaching vehicle user.

11. The system according to claim 10, wherein the vehicle sensor identification circuit and the memory are configured to determine that the movement data corresponds to a movement profile is performed after leaving and/or after approaching the vehicle before opening the vehicle.

12. The system according to claim 10, wherein the fused sensor data comprises sensed data in an immediate vicinity of the vehicle and outside the immediate vicinity.

13. The system according to claim 12, wherein the vehicle sensor identification circuit and the memory are configured to detect a distance and/or position of the vehicle user relative to the vehicle in the immediate vicinity of the vehicle, the detecting being detected by a propagation time measurement between at least one radio component integrated in the vehicle.

14. The system according to claim 13, wherein the radio components comprise ultra-wideband components (UWB).

15. The system according to claim 10, wherein the plurality of different sensor data comprises sensor data from at least two of acceleration sensors, gyro sensors, magnetic sensors, and combination thereof.

16. The system according to claim 10, wherein the fused sensor data comprises movement data divided into successive time samples.

17. The system according to claim 16, wherein the fused sensor data comprises a movement sequence of the vehicle user with respect to a location in the immediate vicinity of the vehicle.

18. The system according to claim 17, wherein the vehicle sensor identification circuit and the memory are configured to determine that the movement data detected corresponds to the received movement profile by determining that movement data detected at the point in time of the approach correspond to a movement sequence.

19. A method for authenticating a vehicle user for a vehicle with the aid of the movement data, comprising:
receiving a movement profile for the vehicle user, wherein the movement profile comprises fused sensor data from a plurality of different sensor data associated with multiple layers of linked artificial neurons and vectors characterizing movements of the vehicle user, and wherein the fused sensor data comprises time-adjusted sensor data based on characterized movements along successive time samples;
detecting the vehicle user's approach to the vehicle using a propagation time measurement between at least one radio component integrated in the vehicle;
obtaining movement data from the detected user's approach to the vehicle;
determining that the movement data detected corresponds to the received movement profile; and
authorizing at least one function of the vehicle for use by the approaching vehicle user.

20. The method according to claim 19, wherein the plurality of different sensor data comprises sensor data from at least two of acceleration sensors, gyro sensors, magnetic sensors, and combination thereof.

* * * * *